United States Patent [19]

Chryssolouris

[11] Patent Number: 4,625,093

[45] Date of Patent: Nov. 25, 1986

[54] STOCK REMOVAL BY LASER CUTTING

[75] Inventor: George M. Chryssolouris, Cambridge, Mass.

[73] Assignee: Massachusetts Institute of Technology, Cambridge, Mass.

[21] Appl. No.: 822,915

[22] Filed: Jan. 24, 1986

Related U.S. Application Data

[63] Continuation of Ser. No. 640,764, Aug. 14, 1984.

[51] Int. Cl.[4] ............................................. B23K 26/00
[52] U.S. Cl. ..................... 219/121 LJ; 219/121 LH; 219/121 LS; 219/121 LT; 219/121 LG; 219/121 LN
[58] Field of Search ................. 219/121 LH, 121 LJ, 219/121 LG, 121 LN, 121 LT, 121 LS, 121 LY

[56] References Cited

U.S. PATENT DOCUMENTS

| | | | |
|---|---|---|---|
| 3,404,254 | 10/1968 | Jones | 217/121 LH |
| 3,499,136 | 3/1970 | Nunnikhoven et al. | 219/121 LH |
| 3,597,578 | 8/1971 | Sullivan et al. | 219/121 |
| 3,604,890 | 9/1971 | Mullaney | 219/121 LG |
| 3,749,878 | 7/1973 | Sullivan et al. | 219/121 |
| 4,170,726 | 10/1979 | Okuda | 219/121 LH |
| 4,201,905 | 5/1980 | Clark et al. | 219/121 L |
| 4,427,872 | 1/1984 | Saunders | 219/121 LH |

OTHER PUBLICATIONS

Nivens, Technical Digest (Western Electric), "Laser Beam Wire Stripping Machine", No. 56, pp. 19 and 20, Oct. 1979.
Patents Abstracts of Japan, vol. 8, nr. 100, 11 May 1984, p. 1537 (M295) & JP, A, 5913588 (Tokyo Shibaura Denki) 24 Jan. 1984.

*Primary Examiner*—C. L. Albritton
*Attorney, Agent, or Firm*—Hamilton, Brook, Smith & Reynolds

[57] ABSTRACT

Method of removing stock from difficult to machine workpieces comprising directing a first laser beam ($LB_1$) at a workpiece along a first axis to produce a first kerf. A second laser beam ($LB_2$) is directed at the workpiece along a second axis which intersects the first axis to produce a second kerf. Relative motion is effected between the workpiece and the laser beams whereby the intersecting kerfs produce a separate solid removable portion (14) from the workpiece.

18 Claims, 13 Drawing Figures

STOCK REMOVAL BY LASER CUTTING

This is a continuation of co-pending application Ser. No. 640,764 filed on Aug. 24, 1984.

FIELD OF THE INVENTION

This invention relates to stock removal and more particularly to a method and apparatus for the removal of stock from hard or difficult to machine materials such as refractories and ceramics by laser cutting.

BACKGROUND OF THE INVENTION

Conventional machining and other stock removal techniques such as turning, milling and planing involves the shaping of a desired article from a blank by the removal of stock by either moving the workpiece relative to a stationary tool, or by moving the tool relative to stationary workpiece or combinations thereof. In turning for example, one end of a workpiece is gripped in the chuck of a lathe with the other end engaged and centered by the tail stock. The work is rotated with regard to a cutting tool which may be translated in a direction parallel to the axis of rotation as well as moved inwardly toward the axis of rotation. By gradually advancing the tool toward the workpiece, chips are removed until the workpiece obtains its desired configuration. The result is that 100% of the stock that has been removed, has been cut and becomes waste in the form of chips, slivers and the like.

Likewise, in the conventional milling process, a workpiece is placed on a table in a position to be engaged by a rotating milling cutter. The work table translates the workpiece relative to the cutter and simultaneously the cutter may be moved toward the workpiece increasing the depth of cut until the desired shape is obtained. Again the result is that all of the stock removed to obtain the desired shape of the workpiece becomes waste, and energy is dissipated over 100% of the removed stock. The same is true of shaping and planing. These techniques have been used for decades in woodworking, metalworking, stone cutting etc.

Not all techniques however require the cutting or stock removing energy to be dissipated over the entire volume of material removed, as for example the simply technique of sawing. A cut is made by a blade, which for the most part removes a solid piece of the stock, with the only energy being dissipated in the volume which forms the kerf. Thus, from an efficiency standpoint, the cutting energy is dissipated over a volume less than the entire volume of material removed.

Many exotic materials having high strength and hardness have been developed for and as a result of the space age. While they are extremely useful in the environments for which they were developed, they are for the most part difficult to machine when employing conventional cutting techniques which rely upon the mechanical removal of the material described above.

Such material would include for example, aluminum oxide, zerconium oxide, steel of 60 Rockwell and harder, composite materials, as for example, epoxy with fillers such as carbon or glass fibers. These materials because of their hardness or brittleness or high tensile strength offer considerable resistance to conventional machining processes which depend upon the complete mechanical removal of volume of material to produce a final desired shape.

Concurrently with the evolution of space age materials has been the development of laser beam technology and in the area of material removal technique has been primarily involved in micromachining such as surface engraving, the drilling of small holes in hard materials, scribing in the electronic industry, and the cutting of sheet material.

Precise and accurate stock removal can be obtained by melting or vaporizing portions of a workpiece to obtain the desired shape by directing concentrations of light energy to the workpiece which may be either stationary or moving. For example the use of a laser in conjunction with a punch press is disclosed in U.S. Pat. No. 4,201,905. A workpiece, such as sheet of metal on a worktable is moved by grippers beneath a fixed laser, which is positioned to project a beam downwardly on a vertical axis. Pieces are cut from the workpiece by melting holes on a continuous line. This technique is generally limited to work on relatively thin sheets of stock.

Single lasers have been used in conjunction with metal turning. For example, U.S. Pat. No. 3,404,254 to Jones discloses a machine and technique for engraving the surface of a circular body by laser melting. A single laser beam is directed to the surface by a rotating cylinder. As the cylinder rotates the laser is translated axially of the cylinder to melt a continuous line in its surface. The cylinder is then rotated at sufficient speed to remove the melted localized portions from the cylinder by centrifugal force. While the desired results are achieved by engraving, the entire volume of stock removed is subjected to the laser energy.

In like manner, U.S. Pat. No. 4,170,726 to Okuda discloses directing a laser beam at selected portions of the surface of the workpiece tangentially of the path of rotation. Thereafter the molten material is removed by means of shaping mechanically of the workpiece. Hence, all of the stock removed is subject not only to the laser energy but the energy imparted by the shaper.

Similarly U.S. Pat. No. 3,499,136 to Nunnokhoven et al. describes a rotating body being balanced by removing the material from the body while it is rotating. The stock is removed by a laser which melts small particles of material from the rotating workpiece. This too requires all of the stock removed to be subjected to energy.

An object of the present invention is to utilize laser cutting techniques to shape a workpiece from materials which are not readily adaptable to normal metal cutting techniques and at the same time operating with a minimal expenditure of energy.

Another object of the invention is to remove stock from a workpiece to obtain a desired configuration without subjecting all of the removed stock to energy dissipation.

Still another object of the present invention is to remove stock from a workpiece without the creation of undue waste and whereby portions of the workpiece which are removed may be functionally utilized rather than being turned into discardable waste.

STATEMENT OF THE INVENTION

The invention resides in a method for removing stock from difficult to machine workpieces by laser cutting and the apparatus for preforming the method. The method in its broadest sense includes projecting a first laser beam at a workpiece along a first axis to produce a kerf in the workpiece; directing a second laser beam at the workpiece along a second axis intersecting the first axis to produce a second kerf intersecting the first kerf. During the laser cutting, relative motion is effected between the workpiece and the laser beams whereby the intersecting kerfs produce a separate, solid removable portion from the workpiece.

In a more specific application, the workpiece is rotated, as for example, in the chuck of a lathe while the laser beams are being directed at it. As a result, the intersecting kerfs produce a separate solid removable portion from the workpiece which has at least one cylindrical surface.

In another embodiment of the invention, laser beams are directed at a workpiece along first and second axis; linear motion is effected relatively between the workpiece and a laser beam along a third axis which may be equal to the length of the workpiece measured along that axis or begun and ended at a distance less than the length of the workpiece. This is done to extend the intersecting kerfs along the third axis to produce a separate solid removable portion of the workpiece which has at least one planar surface. The steps may be repeated to produce a plurality of parts from the workpiece as dictated by the energy requirements of making a single cut versus a plurality of smaller cuts.

Another aspect of the invention resides in making the laser cutting kerfs simultaneously.

The method may be performed by producing the first and second laser beams from a single laser beam source, by splitting the laser beam source into two component parts.

The beams may be directed at the workpiece at acute angles to produce a removable portion which has at least one conical surface. When the workpiece is being rotated about an axis of rotation relative, linear motion may be imparted between the workpiece and one of the laser beams in a direction parallel to the axis rotation. When that motion is continuous, the shape of the solid removable portion is a helix.

Appropriate apparatus is disclosed for not only producing laser beams, but for effecting the relative motion between the workpiece and the beams.

The above and other features of the invention including various novel details of construction and combinations of steps and parts will be more particularly described with reference to the accompanying drawings and pointed out in the claims. It will be understood that the particular method and apparatus for stock removal by laser cutting embodying the invention is shown by way of illustration only and not as a limitation of the invention. The principles and features of this invention may be employed in varied and numerous embodiments without departing from the scope of the invention.

BEST MODE OF CARRYING OUT THE INVENTION

Figure 1:
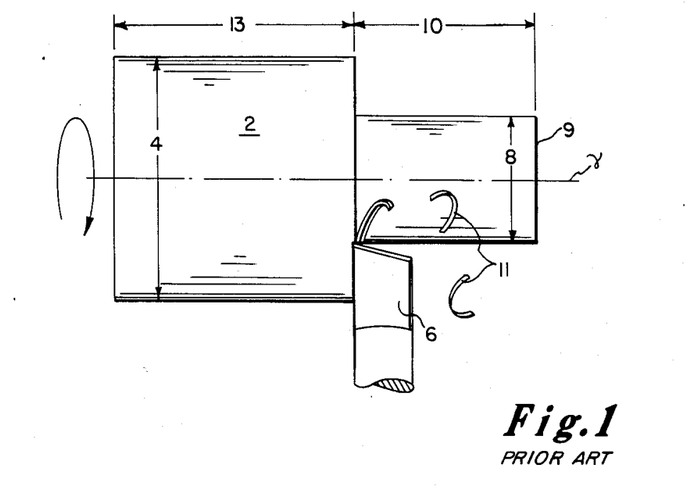
FIG. 1 is a schematic representation of the conventional practice of lathe turning where stock is removed from a workpiece by a conventional metal cutting tool which produces chips.

FIG. 1 discloses pictorially a workpiece 2 having an original diameter 4 being rotated about its axis $v$ in the direction shown by the arrow. A conventional cutting tool 6 is reducing the original diameter of the workpiece to a new diameter 8 by cutting away all of the material from its face 9 a distance 10, and producing chips 11 from all of the volume removed. Thus, energy has been dissipated throughout the entire volume of removed stock. This illustrates conventional technique of lathe turning.

Figure 2:
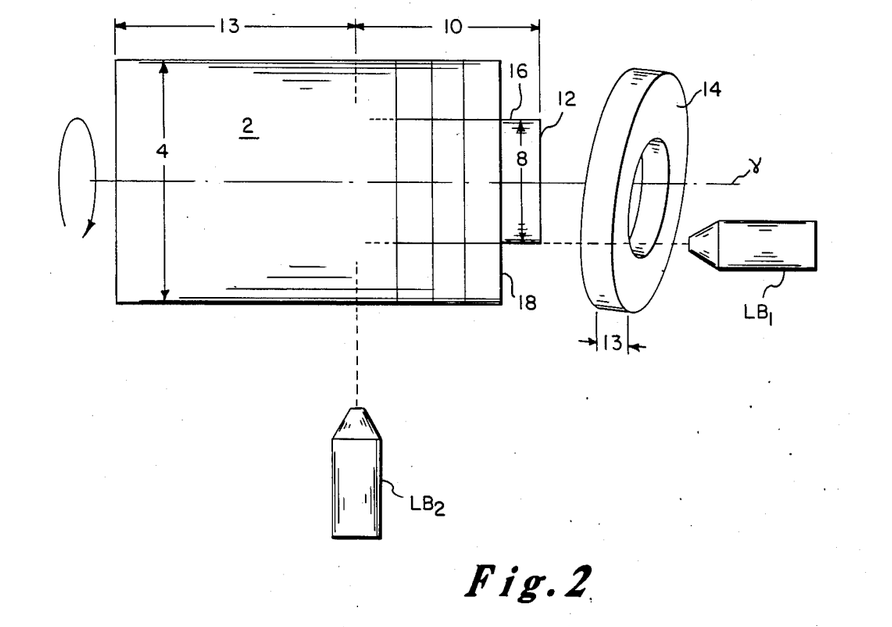
FIG. 2 is a schematic representation of laser turning embodying the principles of this invention wherein stock is removed from a rotating workpiece to produce a cylinder of desired configuration by removing successive circular rings of solid material which may have other utilitarian functions.

FIG. 2 illustrates the technique of stock removal in accordance with the features of the present invention. The same size original workpiece 2 is also rotated about its axis $v$ to reduce its original diameter 4 to the smaller diameter 8. A laser applicator or gun produces a laser beam generally described $LB_1$, directed to make a trepanning kerf on the frontal surface 12 of the workpiece in a circular configuration having a diameter 8. Simultaneously or sequentially, a second laser beam $LB_2$ cuts a transverse kerf in the circumferential surface of the workpiece. The second beam $LB_2$ is shown making its fifth transverse cut. When the kerfs intersect, a ring 14 is separated from the workpiece 2 leaving a cylindrical segment 16 projecting from the then new frontal surface 18 of the workpiece. Successive rings are cut from the workpiece until the workpiece has the same final configuration as by the prior art technique shown in FIG. 1, i.e. a cylinder having a diameter 8 and a length 10 projecting from the uncut portion of the workpiece which has a diameter 4 and length 13.

Thus it will be seen, that whereas the same volume of material has been removed by the removal of a series of rings 14, energy is dissipated only in the volume represented by the material removed in the trepanning kerf produced by the laser beam $LB_1$ and the transverse kerfs produced by the laser beam $LB_2$. It is possible, to obtain the desired configuration by a single application of laser beam $LB_1$, wherein the trepanning kerf is produced in the face of the workpiece to a depth equal to the dimension 10 coupled with a single sequential or simultaneous cut by $LB_2$ which laser beam produces a kerf intersecting that of $LB_1$ at a depth equal to the final desired diameter 8 and located at the distance 10 from the frontal face 12. In this instance a longer cylindrical ring will be removed.

Figure 3:
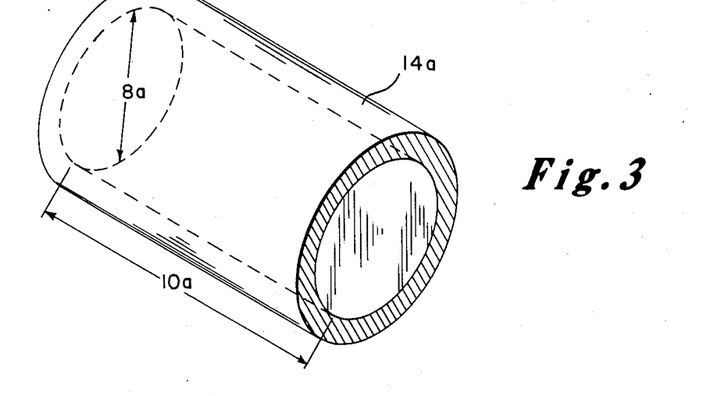
FIG. 3 discloses a hollow cylinder which has been removed from a solid workpiece by the present invention wherein the removed portion is the final desired product.

FIG. 3 represents the removed longer cylindrical ring 14a the length of which is equal to the dimension 10a and the inner diameter 8a of which is equal to the finished diameter 8 plus twice the width of the trepanning kerf. The length 10a is equal to the dimension 10 of the FIG. 2 finished workpiece minus the width of one transverse kerf.

It will be appreciated that the removed ring 14a could well be the desired workpiece as can the rings 14 which are removed in accordance with the FIG. 2 illustration.

Whether the finished workpiece is obtained by removing a plurality of short rings, a helical spiral, a lesser number of longer rings or a single, still larger ring is dependent upon criteria applied: speed or accuracy. A plurality of short axial rings increases the time to create the final workpiece. However, the high accuracy is obtained, a single transverse cut and a single trepanning cut is most time efficient but some accuracy could be lost in the final product do to beam variations in the long trepanning cut where the beam strikes the vaporized material and the walls of the proceeding portion of the kerf it is cutting.

Figure 4:
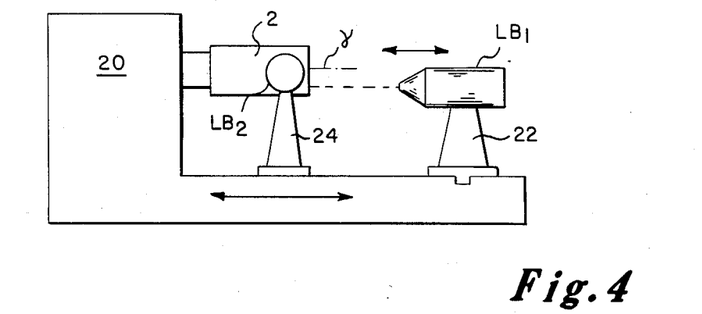
FIG. 4 is a side elevation of a laser lathe showing schematically two laser cutting heads in operative position.
Figure 5:
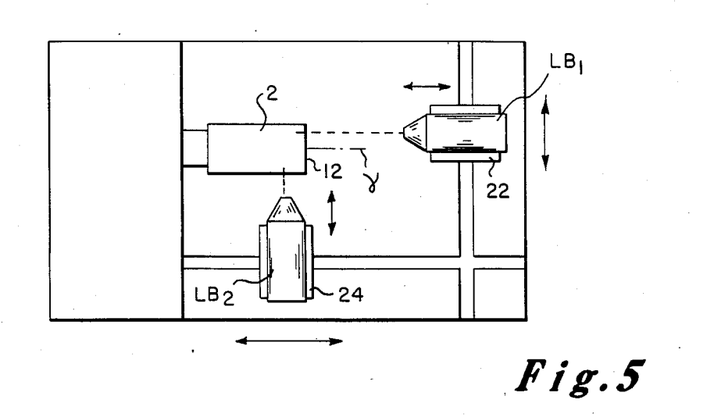
FIG. 5 is a plan view of the laser lathe shown in FIG. 4.

FIGS. 4 and 5 are schematic representations of a lathe having a headstock 20, a tail stock 22 and a cross slide 24. As will be seen by the directional arrows, laser beam $LB_1$ which is mounted on the tail stock 22 is moveable in a direction parallel to the axis of rotation $v$ of the workpiece as well as transversely of that axis. It is also moveable toward and away from the frontal face 12 of the workpiece which will increase or decrease the intensity of the beam for the purpose of focusing.

In like manner, laser beam $LB_2$, which is mounted on the cross slide is moveable parallel to the axis of rotation $v$ of the rotating workpiece to locate the transverse cut to determine the length of the removed ring. It is also moveable in a direction normal to the axis a to vary the laser intensity of the beam.

Alternatively, the laser beam may be stationary while the workpiece is translated in the direction parallel to the axis of rotation of the workpiece and transversely of that axis.

Figure 6:
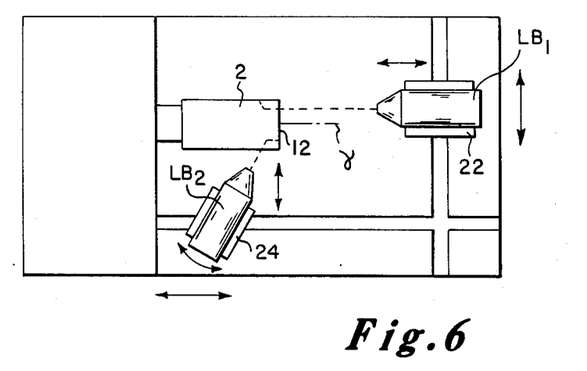
FIG. 6 is a plan view of the laser lathe with the laser beams directed to cut conical or truncated conical slopes.

As seen in FIG. 6 it is also within the scope of this invention to position either or both of the laser beams $LB_1$ and $LB_2$ on a diagonal with respect to the tail stock 22 and the cross slide 24 whereby the beams intersect at an acute angle to produce various combinations of cones or truncated cones when these are removed from the workpiece leaving inverse configurations on the uncut portion of workpiece 2. Alternatively, the workpiece can be positioned on a diagonal with respect to laser beams $LB_1$ and/or $LB_2$.

Figure 12:
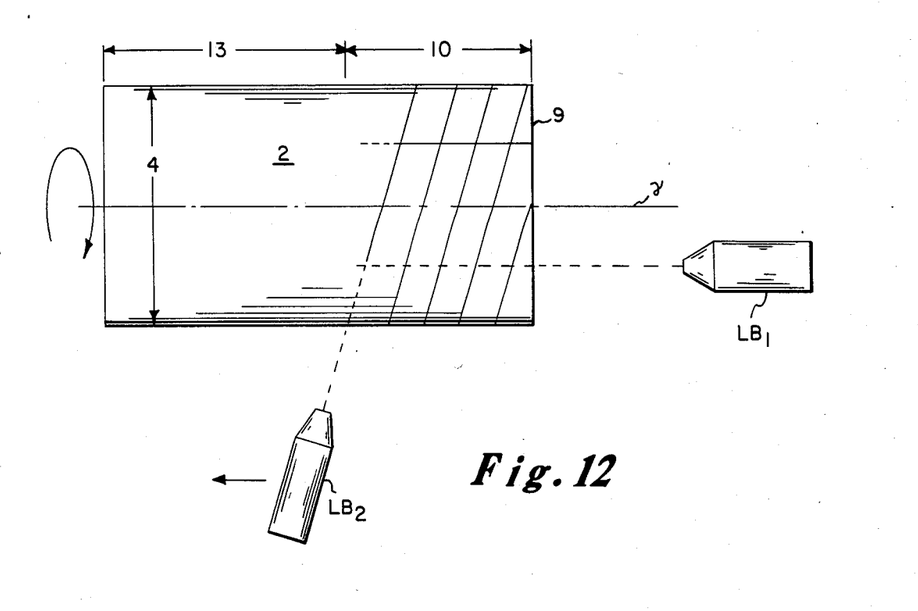
FIG. 12 is similar to FIG. 2 but discloses a helical coil being removed from the workpiece.
Figure 13:
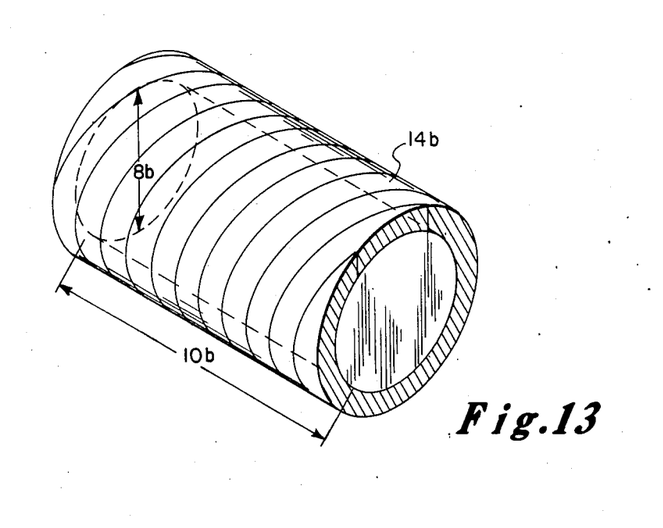
FIG. 13 discloses the helical coil which was removed by the process shown in FIG. 12.

In FIG. 12, $LB_1$ is shown making the trepanning kerf parallel to the axis of rotation of the workpiece 2. $LB_2$ is directed at an acute angle to the axis and is moved at a constant rate of speed to the left as seen in FIG. 12. This cuts a continuous helical spiral 14b shown in FIG. 13 having an outer diameter 14b, an inner diameter 8b and a length 10b.

Figure 7:
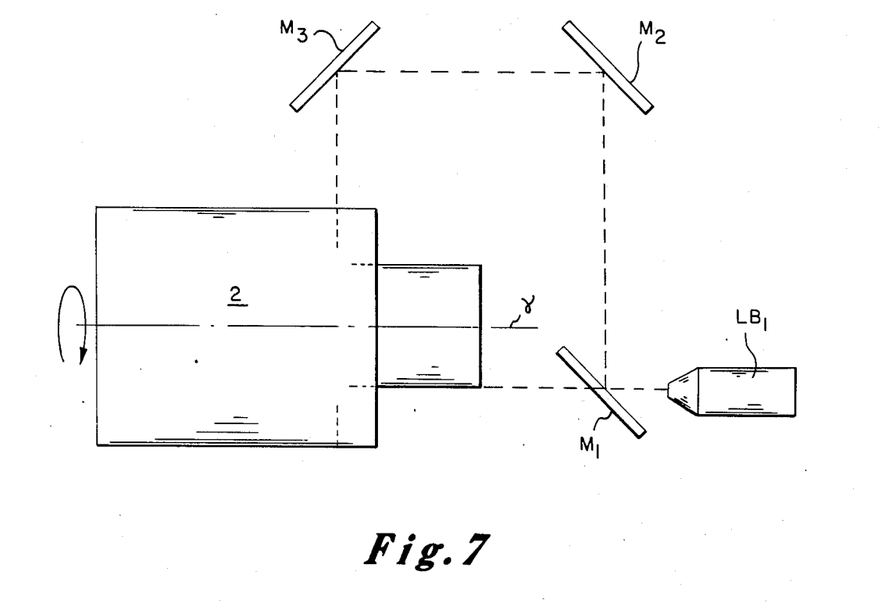
FIG. 7 is a plan view of a laser lathe employing the split beam technique.

FIG. 7 discloses apparatus and a method of producing both the trepanning cut and the transverse cut simultaneously by splitting the beam of a single laser. As in the FIG. 2 example, the workpiece 2 is rotated in the direction of the arrow. Laser beam $LB_1$, is mounted on the tail stock of the lathe and is directed to make trepanning cut. Interposed in the path of the laser beam is a mirror $M_1$ which is designed to permit part of the laser energy to pass through it and to reflect part. The mirror is positioned at an angle of 45° to the direction of laser beam $LB_1$. A second mirror $M_2$ is positioned opposite the first, but is a fully reflecting mirror. It is also located at 45° to the direction of the reflected laser beam. A third mirror $M_3$ is positioned to reflect the beam from mirror $M_2$ in a direction normal to the axis a of the rotating workpiece 2. Thus a single laser beam source is employed to make the trepanning cut as well as the transverse cut simultaneously.

Depending upon the depth of the trepanning cut as compared to the depth of the transverse cut, the energy requirements may be the same or different. If the energy requirements are the same, mirror $M_1$ would be selected to permit half the energy to pass through and half be reflected. If for example more energy e.g. in the ratio of 3:2 were required to make a trepanning cut than a transverse cut, the mirror would be 60% transmitting and 40% reflecting. Thus the mirror's reflective qualities are a function of the energy requirements of the cut.

Similar results of varying the energy application may be obtained by shuttering. For example, if $M_1$ were a 50—50 mirror, a shutter may be employed with either $M_2$ or $M_3$ to cut off the reflected beam for selected periods of time to reduce the total energy of the transverse cut to the desired amount.

An example of cutting a ring from a cylindrical section of acrylic is as follows: the ring was rotated at 5 revolutions per minute subjecting it to a trepanning cut of 25 total pulses of 500 milliseconds each with 1 millisecond between pulses. The transverse cut was made with 5 total pulses of 500 milliseconds each separated by 1 millisecond. The cut off ring was 1.18 inches in length having an outer diameter of 1.540 and an inner diameter of 1.030 inches and having walls thickness of 0.255 inches. The power rating of the laser was 1000 watts.

Figure 8:
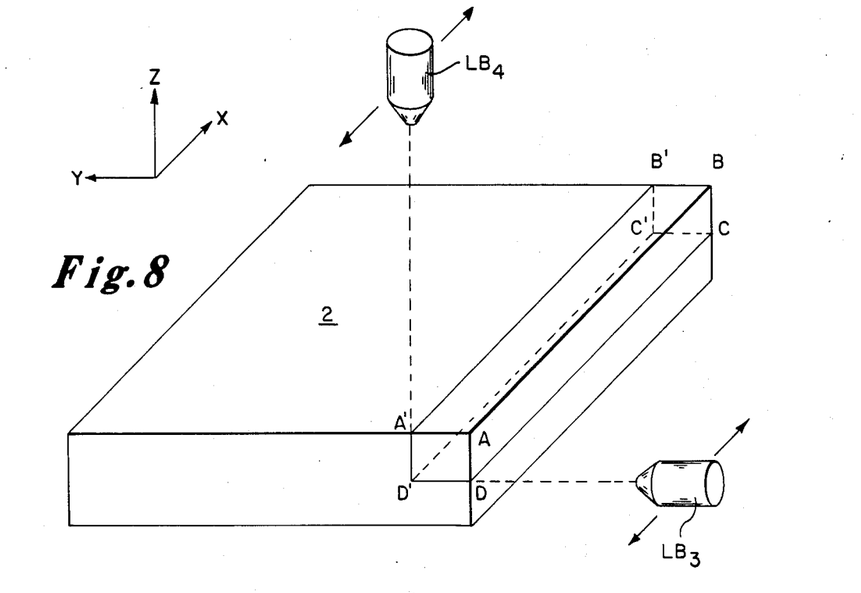
FIGS. 8, 9, 10 and 11 are schematic perspective views of laser cutting heads arranged to perform the functions of a milling machine to produce not only conventional configurations, but configurations not obtainable with conventional milling machines.
Figure 9:
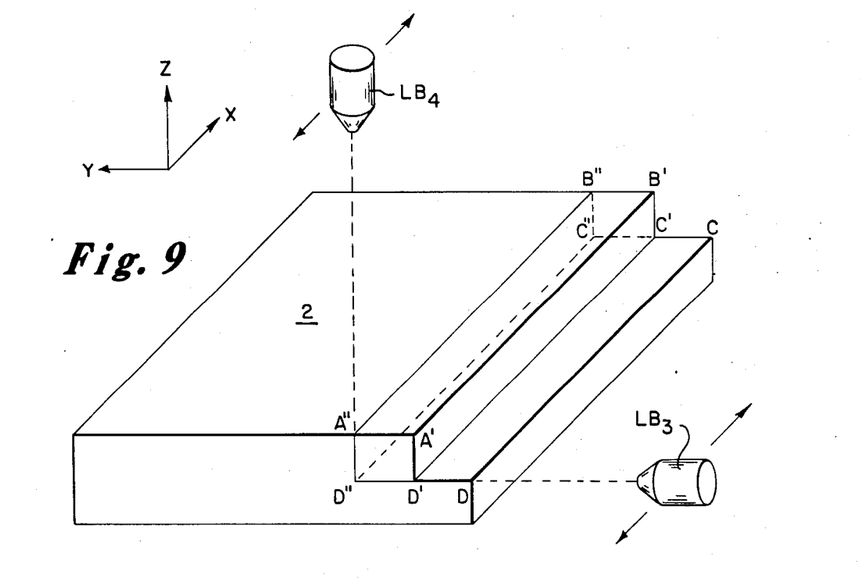

The same technique laser cutting shown in FIGS. 2 through 7 is shown in FIGS. 8 through 11 performing a milling operation on prismatic workpieces. In FIGS. 8 and 9 a laser beam $LB_3$ is directed at workpiece 2 along the Y axis. A second laser beam $LB_4$ is directed at the workpiece downwardly along the Z axis. As in the laser turning technique, either a single laser beam employing beam splitting may be utilized, or as shown in the FIGS. 8 and 9 two separate laser beams are used. The laser beams may be translated along the X axis or alternatively may be stationary while the workpiece is translated along this axis. A slab A, B, C, D, A', B', C', D' is removed from the workpiece 2 to leave a step in the workpiece as shown in FIG. 9. The process may be repeated to remove another slab A', B', C', D', A'', B'', C'', D'' and may be repeated as many times as desired to produce the desired configuration or to reduce the entire upper surface of the workpiece 2 to planar.

Figure 10:
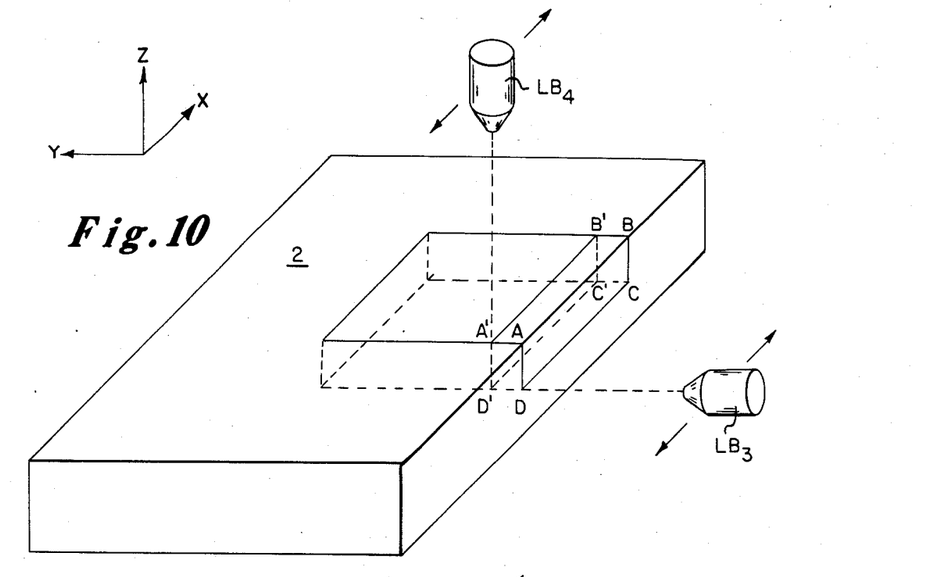
Figure 11:
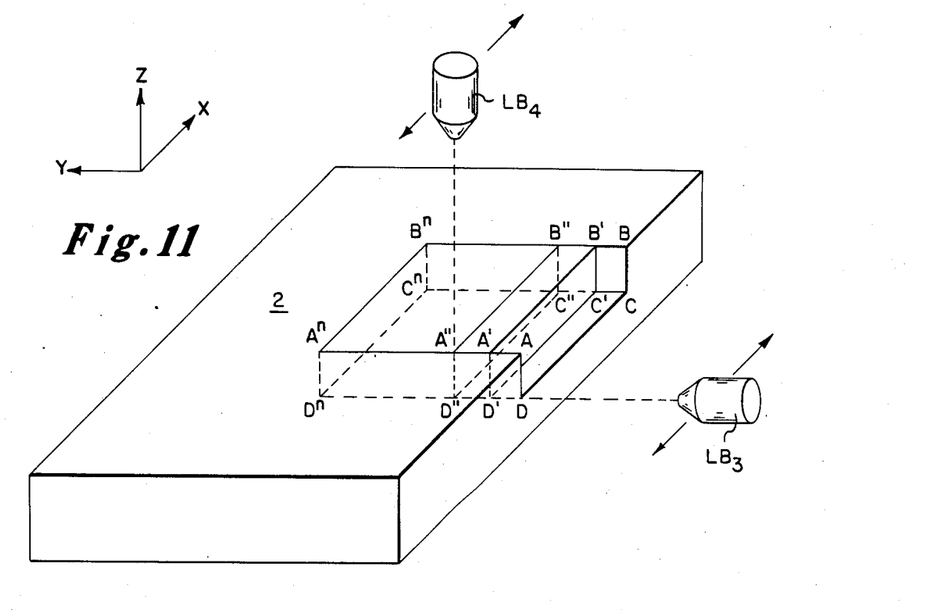

Still another example of laser cutting is shown in FIGS. 10 and 11 wherein a pocket is cut in a prismatic workpiece. Laser beams $LB_3$ and $LB_4$ are oriented along the same axis as FIGS. 8 and 9. The workpiece may be moved along the X axis or held stationary and laser beams moved along the X axis. The laser beam $LB_3$ produce a kerf D, C, C' D' and laser beam $LB_4$ produces a kerf A',B',C',D'. But in this instance a slab will not be removed. Before this can happen, kerfs A, A', B', D and kerf B, B', C', C must be made. Depending on choice, laser beam $LB_4$ will move along the Y axis or held stationary and the workpiece moved along this axis or the laser beam $LB_3$ will move vertically upwardly along the Z axis. The same technique will be repeated by orienting the workpiece or laser beams so that either laser beam $LB_4$ or laser beam $LB_3$ makes a similar kerf as above described to cut the face B, C, C', D'.

The process may be repeated as shown in FIG. 11 to remove the slab A',B',C',D',A",B",C",D" and again repeated ultimately to produce the desired step configuration A, B, C, D, $A^n$, $B^n$, $C^n$, $D^n$.

I claim:

1. A method of removing stock from difficult to machine workpieces comprising:
   directing a first laser beam at a first location on a workpiece and along a first axis to produce a first kerf,
   directing a second laser beam at a second location on the workpiece which is spaced from the first location on the workpiece and along a second axis intersecting the first axis to produce a second kerf intersecting the first kerf, and
   effecting relative motion between the workpiece and the laser beams whereby the intersecting kerfs produce a separate, solid removable portion from the workpiece.

2. A method of removing stock from difficult to machine workpieces comprising:
   rotating a workpiece,
   directing a first laser beam at the workpiece parallel to its axis of rotation to produce a trepanning kerf,
   directing a second laser beam at the workpiece to produce a transverse kerf intersecting the trepanning kerf,
   whereby the intersecting kerfs produce a separate, solid removable portion from the workpiece having at least one cylindrical surface.

3. A method of removing stock from difficult to machine workpieces comprising:
   directing a first laser beam at a first location on a workpiece and along a first axis to produce a first kerf,
   directing a second laser beam at a second location on the workpiece which is spaced from the first location on the workpiece and along a second axis intersecting the first axis to produce a second kerf intersecting the first kerf,
   effecting relative linear motion between the workpiece and the laser beams along a third axis, for a distance equal to the length of the workpiece, measured along the third axis to extend the intersecting kerfs along the third axis to produce a separate solid removable portion form the workpiece having at least one planar surface.

4. The method of claim 2 wherein the directing of the laser beams occur simultaneously.

5. The method of claim 2 wherein the beam directing steps are repeated to produce a plurality of removable portions from the workpiece.

6. The method of claim 2 wherein the first and the second laser beams are produced from a single laser beam source by splitting the single source beam into two component parts.

7. The method of claim 2 where the second laser beam is directed at the workpiece at an acute angle whereby the removable portion of the workpiece has at least one conical surface.

8. The method of claim 2 where the second laser beam is directed at the workpiece at an acute angle and, wherein relative continuous motion is effected between the second laser beam and the workpiece in a direction parallel to the axis of rotation of the workpiece, whereby the shape of the separate, solid removable portion of the workpiece is a helix.

9. Method of claim 3 wherein the movement along the third axis is begun and ended at points spaced from opposite ends of the workpiece measured along the third axis and,
   wherein relative motion is effected between one laser beam and the workpiece along one of the first or the second axes to produce a third kerf intersecting the first and the second kerfs to produce a separate solid removable portion of the workpiece having a linear dimention along the third axis equal to the distance between the points spaced from the ends of the workpiece.

10. The method of claim 1 wherein the directing of the laser beams occur simultaneously.

11. The method of claim 3 wherein the directing of the laser beams occur simultaneously.

12. The method of claim 1 wherein the beam directing steps are repeated to produce a plurality of removable portions from the workpiece.

13. The method of claim 3 wherein the beam directing steps are repeated to produce a plurality of removable portions from the workpiece.

14. The method of claim 1 wherein the first and the second laser beams are produced from a single laser beam source by splitting the single source beam into two component parts.

15. The method of claim 3 wherein the first and the second laser beams are produced from a single laser beam source by splitting the single source beam into two component parts.

16. A method of removing stock from difficult to machine workpieces comprising:
    rotating a workpiece,
    directing a first laser beam at the workpiece parallel to its axis of rotation to produce a trepanning kerf,
    simultaneously directing a second laser beam at the workpiece to produce a transverse kerf intersecting the trepanning kerf,
    whereby the intersecting kerfs produce a separate, solid removable portion from the workpiece having at least one cylindrical surface.

17. A method of removing stock from difficult to machine workpieces comprising:
    rotating a workpiece,
    directing a first laser beam at the workpiece parallel to its axis of rotation to product a trepanning kerf,
    directing a second laser beam at the workpiece to produce a transverse kerf intersecting the trepanning kerf,
    whereby the intersecting kerfs produce a separate, solid removable portion from the workpiece having at least one cylindrical surface, and
    repeating the beam directing steps to produce a plurality of removable portions from the workpiece.

18. A method of removing stock from difficult to machine workpieces comprising:
    rotating a workpiece,
    directing a first laser beam at the workpiece parallel to its axis of rotation to product a trepanning kerf,
    directing a second laser beam at the workpiece to produce a transverse kerf intersecting the trepanning kerf,
    producing the first and second laser beams from a single laser beam source by splitting the single source beam into two component parts,
    whereby the intersecting kerfs produce a separate, solid removable portion from the workpiece having at least one cylindrical surface.

* * * * *